(12) United States Patent
Thompson, Jr. et al.

(10) Patent No.: US 11,437,805 B2
(45) Date of Patent: *Sep. 6, 2022

(54) DOCK MANAGEMENT SYSTEM WITH GFCI FAILURE INDICATION

(71) Applicant: DockIQ, LLC, Dawsonville, GA (US)

(72) Inventors: Albert Matthews Thompson, Jr., Dawsonville, GA (US); Brandon Loyal Turner, Dawsonville, GA (US); Mark Joseph Gordon, Naples, FL (US); Daniel Steven Haligas, Panama City, FL (US); Tom Cullinan, Atlanta, GA (US)

(73) Assignee: DockIQ, LLC, Dawsonville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,771

(22) Filed: Oct. 18, 2021

(65) Prior Publication Data

US 2022/0045501 A1 Feb. 10, 2022

Related U.S. Application Data

(63) Continuation-in-part of application No. 17/063,014, filed on Oct. 5, 2020, now Pat. No. 11,148,638, which
(Continued)

(51) Int. Cl.
| | |
|---|---|
| *G01R 19/165* | (2006.01) |
| *G08B 3/10* | (2006.01) |
| *G08B 5/22* | (2006.01) |
| *H02H 3/20* | (2006.01) |
| *H02H 1/00* | (2006.01) |
| *G08B 25/10* | (2006.01) |

(Continued)

(52) U.S. Cl.
CPC ............ *H02H 3/20* (2013.01); *G08B 3/10* (2013.01); *G08B 5/22* (2013.01); *G08B 21/185* (2013.01); *G08B 25/016* (2013.01); *G08B 25/10* (2013.01); *H02H 1/0007* (2013.01); *H02H 1/0061* (2013.01)

(58) Field of Classification Search
None
See application file for complete search history.

(56) References Cited

U.S. PATENT DOCUMENTS

| | | | |
|---|---|---|---|
| 11,340,279 B1 * | 5/2022 | Fitzgerald | ............... G08B 7/06 |
| 2014/0147208 A1 * | 5/2014 | Devitt | ....................... B63C 3/06 |
| | | | 405/3 |
| 2019/0108744 A1 * | 4/2019 | King, Jr. | ............ G01R 29/0857 |

* cited by examiner

*Primary Examiner* — John F Mortell
(74) *Attorney, Agent, or Firm* — Bryan W. Bockhop; Bockhop Intellectual Property Law, LLC

(57) ABSTRACT

In a method of warning of a hazardous electrical condition at a dock with wiring coupled to a voltage source via a dock breaker, an electric voltage between a ground and at least one of the dock frame or the water is detected. A plurality of voltage values of the electric voltage is stored. When at least two successive voltage values of the plurality voltage values exceeds a baseline safe voltage by a preset margin, then a shock warning signal is asserted, a dock breaker is opened and a shock warning indication is transmitted to a remote unit via a communication chipset. When at a voltage is sensed in the dock wiring system after the dock breaker has been opened, then a faulty dock breaker warning indication is transmitted to the remote unit via the communication chipset.

7 Claims, 10 Drawing Sheets

Related U.S. Application Data is a continuation-in-part of application No. 16/285,917, filed on Feb. 26, 2019, now Pat. No. 10,794,026.

(60) Provisional application No. 62/643,477, filed on Mar. 15, 2018.

(51) Int. Cl.
*G08B 25/01* (2006.01)
*G08B 21/18* (2006.01)

DOCK MANAGEMENT SYSTEM WITH GFCI FAILURE INDICATION

CROSS-REFERENCE TO RELATED APPLICATION(S)

This application is a continuation-in-part of, and claims the benefit of, U.S. patent application Ser. No. 17/063,014, filed Oct. 5, 2020, now U.S. Pat. No. 11,148,638, which is a continuation-in-part of U.S. patent application Ser. No. 16/285,917, filed Feb. 26, 2019, now U.S. Pat. No. 10,794,026, which claims the benefit of U.S. Provisional Patent Application Ser. No. 62/643,477, filed Mar. 15, 2018, the entirety of each of which is hereby incorporated herein by reference.

BACKGROUND OF THE INVENTION

1. Field of the Invention

The present invention relates to property management systems and, more specifically, to a dock management system.

2. Description of the Related Art

Many recreational boat owners own their own docks at which they secure their boats during the boating season. Such docks are often either mounted on wheeled structures or floating docks that are secured to the shore. When lake levels rise as a result of heavy rains, a movable dock must be moved shoreward so that people can access it. Similarly, when lake levels go down as a result of drought, the dock must be moved away from the shore so that the boat will not be grounded.

Dock and boat security are important issues. Every year, many boats are stolen by an individual transporting them to another portion of a lake. Also, boats sometimes become untethered and drift in the lake, which can be hazardous both to the boat and to others.

Many personal docks are wired for electric power, taking power from the grid and using it for lighting the dock and applying auxiliary power to the boat while it is secured to the dock. The wiring for such power is usually placed under the dock. If such wiring becomes degraded through age, it can create a shock hazard.

Many dock owners live well away from their docks and inspect them only when they are at the lake during weekends and vacations. As a result, they may not be aware of situations that require their attention on a real time basis.

Fluctuating water levels due to weather patterns and power requirements frequently ground docks, thus costing dock owners thousands of dollars in damages each year. To prevent damage to docks, lifts, and boats as well as theft and potential loss of life, docks must be monitored continuously. Currently, docks are monitored by the dock owners or dock service companies making frequent visits to the docks and visually inspecting them. This type of monitoring can be time consuming, expensive and can lead to harmful results when the docks are not inspected in sufficient detail.

Also, it is known that a high percentage of ground fault circuit interrupters (GFCI) tend to fail when used in outdoor environments. A system that trips a GFCI when a hazardous voltage is sensed in the dock environment, but that does not ensure that the dock wiring is disconnected from a voltage source can give users a false belief that there are no hazards present, which can result in serious consequences.

Therefore, there is a need for a dock information system that provides dock owners with real time information about their docks while the owners are away from their docks.

SUMMARY OF THE INVENTION

The disadvantages of the prior art are overcome by the present invention which, in one aspect, is an apparatus for managing a dock, a portion of which is disposed over a body of water, from a remote device. A control unit is disposed on the dock. A plurality of sensors is each in data communication with the control unit. Each of the plurality of sensors includes: an electric shock sensor; a water level sensor that senses a distance to the water from a predetermined location of the dock; and a theft detection circuit. A communication chipset is in data communication with the control unit. The control unit includes a processor that is programmed to transmit to the remote device via the communication chipset an indication of the following: a shock likelihood sensed by the electric shock sensor; a level detected by the water level sensor; and an alert when the theft detection circuit detects a likelihood of theft.

In another aspect, the invention is a device for managing a dock, a portion of which is disposed over a body of water. A remote device includes a wireless device selected from a list of wireless devices consisting of: a smart cellular telephone; and tablet PC, a desktop computer and a laptop computer. A control unit is disposed on the dock. A plurality of sensors is each in data communication with the control unit. Each of the plurality of sensors includes: an electric shock sensor that is configured to measure a water voltage between the body of water and a ground and that is configured to trigger a ground fault interrupter circuit to disconnect components of the device from a power supply when a predetermined threshold has been reached; an ultrasound water level sensor that senses a distance to the water from a predetermined location of the dock; and a movement detector that is configured to detect movement of the dock. A cellular telephone chipset is in data communication with the control unit. The control unit includes a processor that is programmed to transmit to the remote device via the cellular telephone chipset an indication of the following: a shock likelihood sensed by the electric shock sensor; and a level detected by the water level sensor. The control unit sets a predetermined perimeter around the dock whenever the dock is purposely repositioned and the control unit issues an alert whenever the movement detector indicates that any part of the dock has moved outside of the predetermined perimeter.

In another aspect, the invention is an apparatus for managing a dock, having a dock frame and a dock wiring system that is connected to a power source by a dock breaker, the dock being disposed in water, configured for use with a remote unit. The apparatus includes a shock detection system. The shock detection system includes at least one electricity probe configured to detect an electric voltage between a ground and at least one of the dock frame or the water and a shock hazard indicator disposed adjacent to the dock that generates a human-perceptible indication of a shock hazard when a shock warning signal is asserted. The system includes a communication chipset and a dock access detection system. The dock access detection system includes a digital camera mounted on the dock and aimed at a first predetermined location on the dock and two infrared sensors spaced apart from each other and mounted on the dock. A control unit is responsive to the shock detection system and is disposed on the dock and including a communication chipset in communication with the remote unit. The control unit is also in communication with the digital camera, the two infrared sensors and the communication chipset. The control unit includes a processor that is programmed to: store a first voltage value received from the at least one electricity probe, the first voltage value being no greater than a voltage known to be safe and designated as a baseline safe voltage; receive a plurality of second voltage values from the at least one electricity probe; and when at least two successive second voltage values of the plurality second voltage values exceeds the baseline safe voltage by a preset margin, then assert the shock warning signal, opening the dock breaker and transmitting a shock warning indication to the remote unit via the communication chipset. The processor is also programmed to: receive an indication from each of the two infrared sensors that motion had been detected; when both of the two infrared sensors indicate motion has been detected, then cause the digital camera to take at least one picture of the first predetermined location; submit the at least one picture to an artificial intelligence routine to determine if a probability that the at least one picture includes an image of a human is above a predetermined threshold; when the probability is above the predetermined threshold, then transmit an alert and a copy of the picture to the remote unit; and take a deterrent action at the dock when the probability is above the predetermined threshold.

In another aspect, the invention is an electric shock detection system for use with a dock having a dock frame and a dock wiring system that is connected to a power source by a dock breaker, the dock being disposed in water. The electric shock detection system is configured for use with a remote unit. At least one electricity probe is configured to detect an electric voltage between a ground and at least one of the dock frame or the water. A shock hazard indicator is disposed adjacent to the dock and generates a human-perceptible indication of a shock hazard when a shock warning signal is asserted. A communication chipset is in communication with the remote unit. A control unit is disposed on the dock and is responsive to the at least one electricity probe and is in communication with the shock hazard indicator and the communication chipset. The control unit includes a processor that is programmed to: store a first voltage value received from the at least one electricity probe, the first voltage value being no greater than a voltage known to be safe and designated as a baseline safe voltage; receive a plurality of second voltage values from the at least one electricity probe; and when at least two successive second voltage values of the plurality second voltage values exceeds the baseline safe voltage by a preset margin, then assert the shock warning signal, opening the dock breaker and transmitting a shock warning indication to the remote unit via the communication chipset.

In another aspect, the invention is a dock security system for use at a dock with a remote unit. A digital camera is mounted on the dock and aimed at a first predetermined location on the dock. Two infrared sensors are spaced apart from each other and are mounted on the dock. A communication chipset is in communication with the remote unit. A control unit is disposed on the dock and in communication with the digital camera, the two infrared sensors and the communication chipset. The control unit includes a processor that is programmed to: receive an indication from each of the two infrared sensors that motion had been detected; when both of the two infrared sensors indicate motion has been detected, then cause the digital camera to take at least one picture of the first predetermined location; submit the at least one picture to an artificial intelligence routine to determine if a probability that the at least one picture includes an image of a human is above a predetermined threshold; when the probability is above the predetermined threshold, then transmit an alert and a copy of the picture to the remote unit; and take a deterrent action at the dock when the probability is above the predetermined threshold.

In another aspect, the invention is a method of warning of a hazardous electrical condition at a dock with wiring coupled to a voltage source via a dock breaker, in which an electric voltage between a ground and at least one of the dock frame or the water is detected. A plurality of voltage values of the electric voltage is stored. When at least two successive voltage values of the plurality voltage values exceeds a baseline safe voltage by a preset margin, then a shock warning signal is asserted, the dock breaker is opened and a shock warning indication is transmitted to a remote unit via a communication chipset. When at a voltage is sensed in the dock wiring system after the dock breaker has been opened, then transmitting a faulty dock breaker warning indication to the remote unit via the communication chipset.

In yet another aspect, the invention includes a routine for detecting when the GFCI fails to properly isolate the voltage source from the dock's wiring. When a voltage is detected in the dock wiring system after the dock breaker has been opened, then the controller transmits a faulty dock breaker warning indication to the remote unit via the communication chipset.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
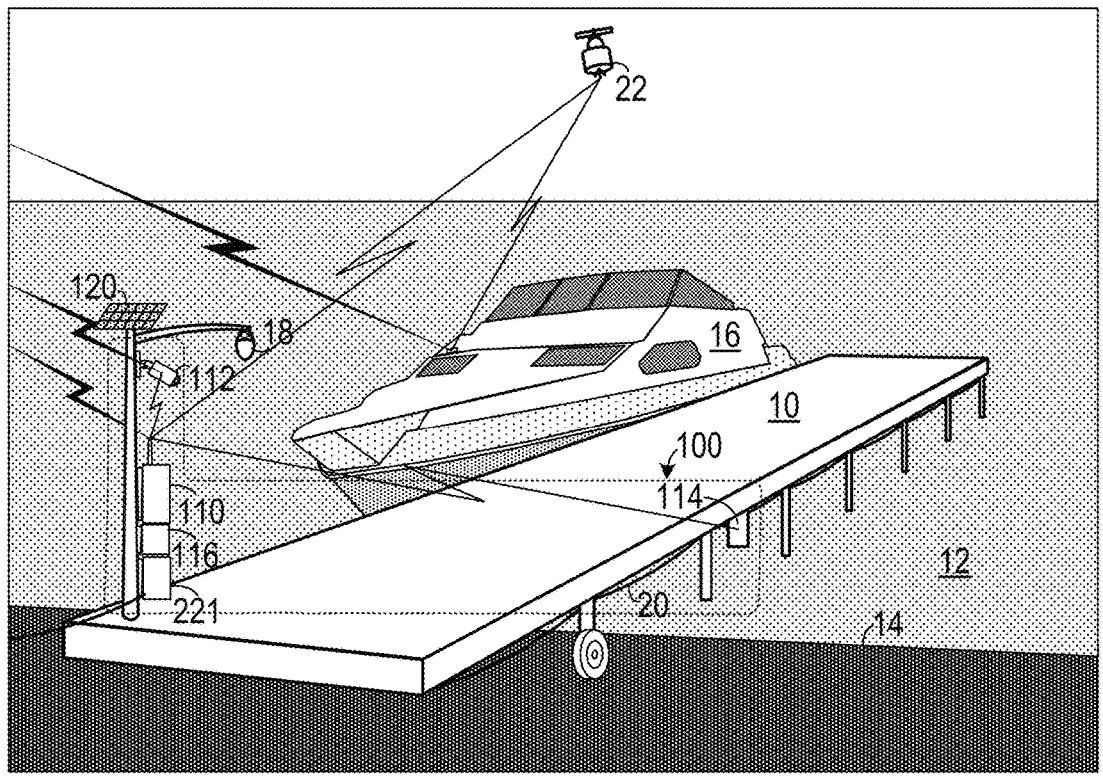
FIG. 1 is a perspective view of a dock employing a dock management system according to one representative embodiment of the invention.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

As shown in FIG. 1, one embodiment of a dock management system is configured to monitor important aspects of a dock 10 and any boats 16 secured thereto. Such a dock 10 is positioned in the water of a lake 12 and secured to the shore 14. The dock 10 can include wiring 20 that provides auxiliary power to the boat 16 and that powers a security light 18. A dock management system 100 can include a master unit 110 that communicates with spaced apart sensors 1014 a video camera 112 so as to provide information to and receive control data from a remote device, such as a cellular telephone, a laptop computer, a desktop computer and the like. Communication can be effected via a transceiver that communicates, for example, via such devices as: a cellular chipset; a wireless network; a hard-wired network, and the like. Both the boat 16 and the master unit 110 can be equipped with a global positioning system (GPS) system that derives location data from GPS satellites 22. The master unit 110 collects data from the sensors 114 and the video camera 112 and transmits the data to a remote location. In one embodiment, the camera 112 includes a chipset that transmits video data directly to a node, such as a Wi-Fi transceiver. Additional components (e.g., a motion sensor, a siren, etc.) can be included in a component box 116 affixed to the lamp pole. The remote location can be, for example, a cellular telephone tower that further transmits the data to a dock management company or to an individual user. The data can be displayed on a computer or a smart phone.

In one embodiment, energy can be harvested from a solar panel 120. In this embodiment, the controller in the master unit 110 uses a voltage regulation circuit that provides a steady 5 VDC source from a 3V to 30V solar panel input to the rest of the system. When AC main power is detected from an AC power-on detection circuit—indicating that the system is being powered from the power grid, the controller disables the solar panel regulator so as to protect the remaining circuitry from excessive voltage input.

Figure 2A:
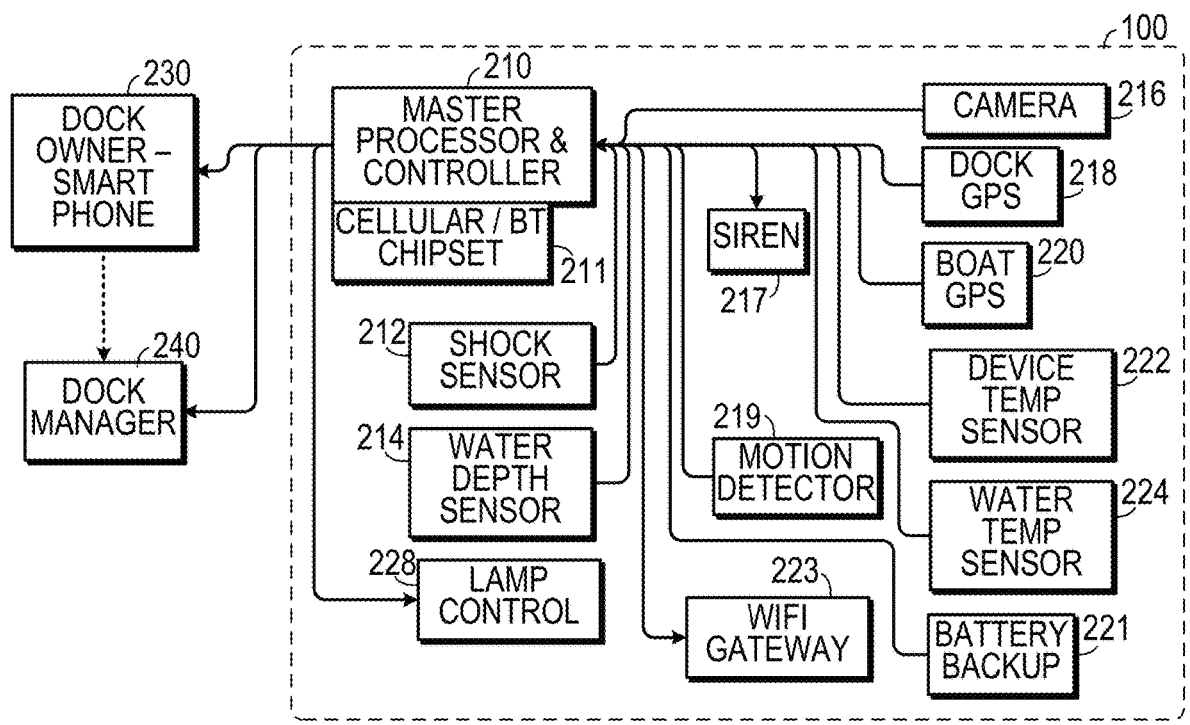
FIG. 2A is a block diagram showing elements employed in a dock management system according one representative embodiment of the invention.

As shown in FIG. 2A, the system 100 can communicate with an owner via a smart phone 230, who can then communicate with a dock management company directly 240 directly (also via smart phone), or it can communicate directly with the dock management company 240 directly if the owner authorizes such direct communication. The system 100 can include a suite of sensors and controlled devices, all of which communicate with a master processor/controller 210. For example, the master processor/controller 210 can include a cellular chipset for communicating with the user and a wireless local personal area network chipset 211 (e.g., a Bluetooth® chipset or a ZigBee chipset) for communicating with devices that are local to the dock 10. The master processor/controller 210 can receive input data from devices including, but not limited to: a shock sensor 212; a water depth sensor 214; a motion detector 219; a camera 216 (the direction of which can be controlled by the master processor/controller 210 in some embodiments); a dock-mounted GPS chipset 218, which provides current location data about the dock 10; a boat-mounted GPS chipset 220, which provides location data about the boat 16; an ambient air temperature sensor 222; and a water temperature sensor 224. The master processor/controller 210 can receive backup power from a battery backup 221 and it can communicate using Wi-Fi via a Wi-Fi gateway 223. Also, it can control a siren 217 or other audible alarm and the lamp 228 for security reasons.

Figure 2B:
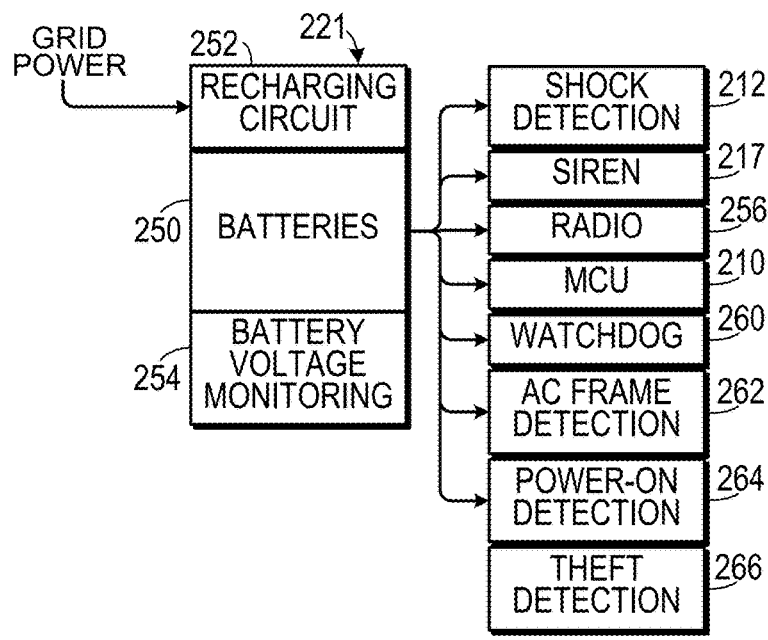
FIG. 2B is a block diagram showing one embodiment of a battery backup system.

As shown in FIG. 2B, the battery backup system provides power to the majority of the system devices and can include a battery recharging circuit 252 that uses power from the power grid to charge one or more batteries 250. A battery voltage monitoring circuit 254 (which is shown separate from the recharging circuit 252, but which can be integrated with it) monitors the current battery voltage and provides low battery voltage notifications. The system devices that can be powered by the battery backup 221 can include, the voltage detection circuit 254, the siren 217, a radio 256, the master control unit (MCU) 210, a watchdog circuit 260 (which is a timer circuit that periodically listens to the processor 210 for an indication that it is still operating and that causes the processor 210 to reboot if such an indication is not received—thus, the watchdog circuit resets the system in the case of an unresponsive MCU by sending an active-low reset pulse control signal), an AC frame detection circuit 262 that determines if the main box for the master unit 110 has a voltage that would give rise to a potential shock hazard (essentially, the AC frame detection circuit 262 can identify a source of electric shock as being from the frame versus the water), and a power-on detection circuit 264 that indicates that the system is working. In one embodiment, the batteries can include lithium polymer (LiPo) batteries and the recharging circuit 221—allows the LiPo battery to be charged to 4.2V. The battery voltage monitoring circuit 254 detects and measures the battery voltage. This can be used to determine if the batteries are nearing their end-of-life. A battery low-voltage management circuit can hold certain items, such as the MCU 210 and the radio 256 in a suspended reset state (Active LOW) if battery voltage gets down to a predetermined voltage, which in one embodiment is 3.08V. It can also send a low battery alarm and operates in a low power mode, in which certain non-essential loads are taken off line.

In one embodiment, the system 100 includes an unauthorized person's detection mechanism (such as a theft detection circuit 266) that can employ a motion sensor, such as an infra-red or ultrasonic motion sensor to detect movement on the dock. Upon detecting motion, the camera takes a picture of the dock and an artificial intelligence routine (which could run on, for example, a local processor, a central server, or a cloud-based service) determines if an image of a human being is detected. If the system detects the presence of a human, then the camera is instructed to take pictures periodically (e.g., every four seconds), the siren 214 is triggered and the owner or manager is alerted. This embodiment can deter theft, vandalism and other situations in which unauthorized people are present on the dock.

Figure 2C:
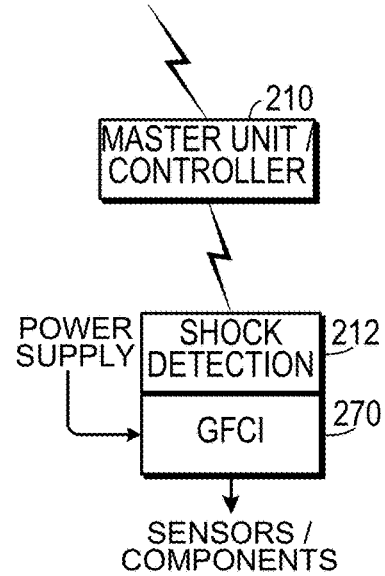
FIG. 2C is a block diagram of one embodiment of a shock detection circuit

As shown in FIG. 2C, the shock detection unit 212 measures a water voltage relative to ground and can trip a ground fault circuit interrupter (GFCI) 270 if that voltage is above a predetermined level, thereby disconnecting grid (or other supply) power from the electrical components on the dock.

In one embodiment, an industrial, scientific and medical (ISM) radio 256 can be used in association with the electric shock detector, which can employ a 2.4 GHz radio running ZigBee two-way wireless communication to communicate data to the controller/collector. The electric shock detector 212 uses a GFCI tripping circuit 270 which applies a 5 mA current from line to ground to trip most GFCIs. The GFCI will be tripped when the voltage read from the voltage detection circuit reads 1 volt or greater. The electric shock detector 212 can also implement an auto-learning feature that, once enabled, sets the non-hazardous voltage read from the voltage detection circuit as the baseline. The system then triggers an alarm and/or wireless alerts when the voltage read from the voltage detection circuit reads 1 volt or greater than the baseline voltage. The baseline voltage can also learn a new baseline voltage at any interval which is useful for monitoring voltages in lakes that already have fluctuating (albeit safe) inherent voltage in the water. Additionally, a shock detector can detect a short in the above-water components to determine if a shock hazard exists and, if so, it can take appropriate actions.

Figure 2D:
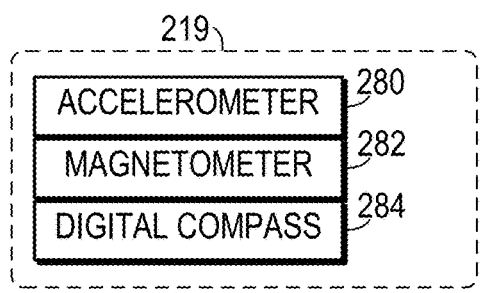
FIG. 2D is a block diagram of one embodiment of a motion detection circuit.

As shown in FIG. 2D, the motion detector 219 can include such items as an accelerometer 280, a magnetometer 282 and a digital compass 284 to supply information about movement of the dock. These items can be integrated with the MCU 210.

Regarding the accelerometer 280 and magnetometer 282 and digital compass 284 sensors, the controller 210 utilizes a special IC sensor with integrated accelerometer 280 and magnetometer 282. The accelerometer 280 can be used to communicate relative dock motion in 3 axes. The magnetometer is used to determine the controller/dock's relative heading. This is useful for determining when a floating dock cable breaks which causes the dock heading to shift. This heading shift is recorded by the sensor and communicated to the system which sends wireless alerts and alarms. The depth sensor 214 can be integrated with the temperature sensor 224. The dock controller 210 interfaces with an application specific ultrasonic depth sensor that also measures and communicates water depth and water temperature to the system. This data can be used to determine when a dock needs to be moved. If the depth is below or above a user-set threshold, then a wireless alert and an alarm may sound.

Figure 3A:
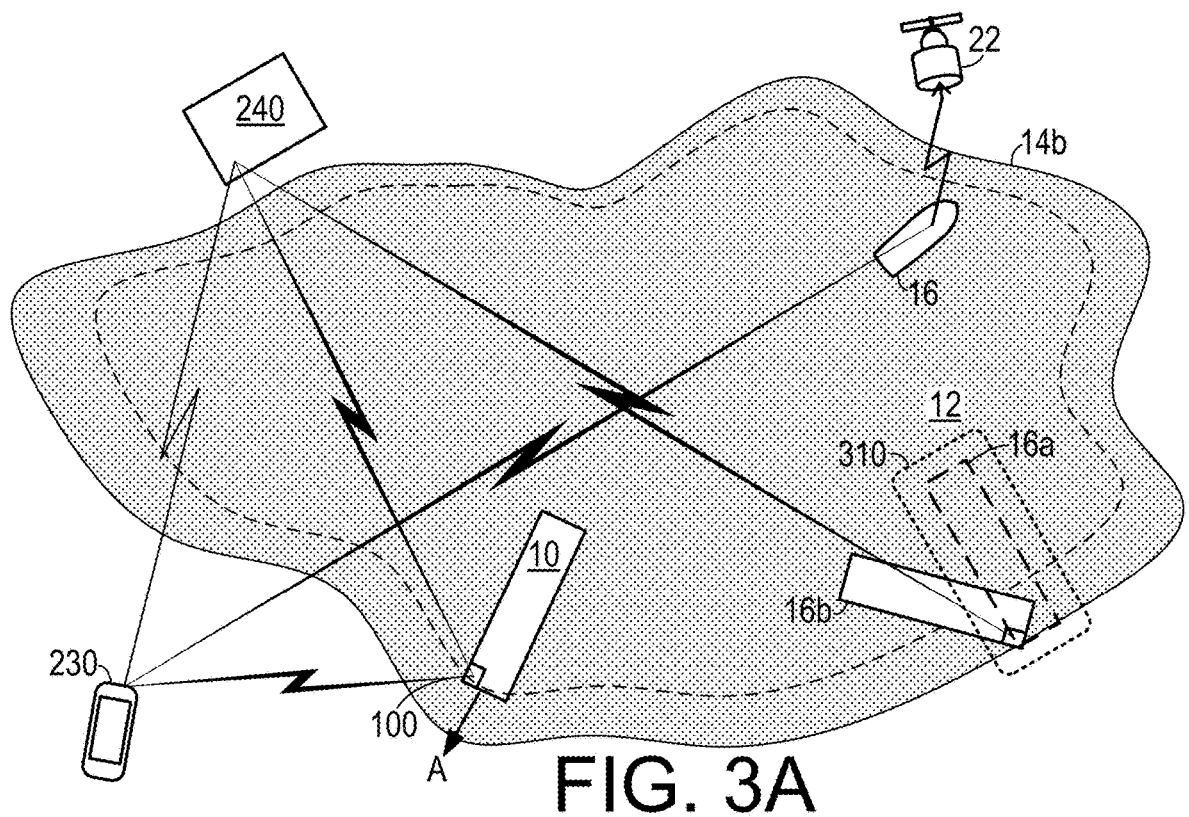
FIG. 3A is a plan view of a lake in a first state and a dock employing one representative embodiment of the invention.
Figure 3B:
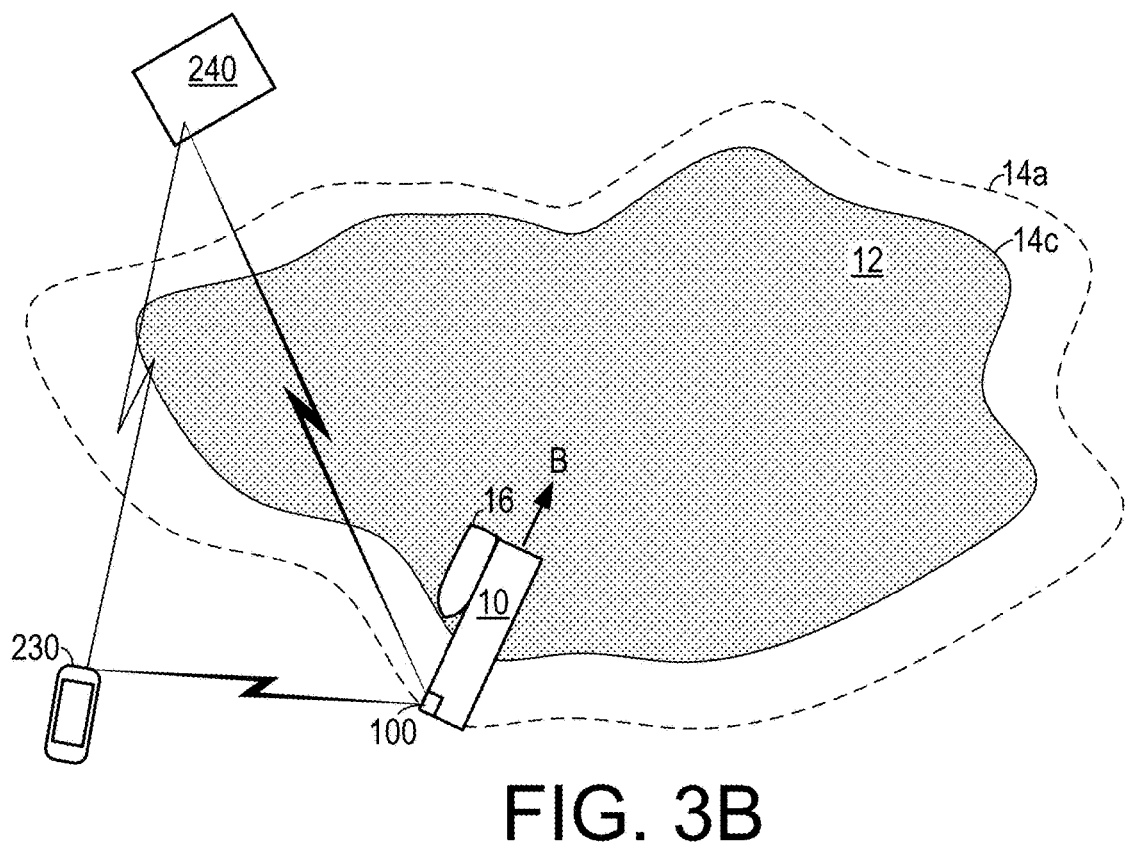
FIG. 3B is a plan view of a lake in a second state and a dock employing one representative embodiment of the invention.

A situation in which the water level in the lake 12 has risen so that the shoreline has expanded from a previous position 14a to a current position 14b is shown in FIG. 3A. In this situation, the system 100 can contact the owner may via a smart phone 230 app that provides information regarding the increased water depth under the dock 10. In such a situation, the owner can contact the dock manager 240 with the app to request that the dock 10 be moved in the direction of arrow A. The owner could select an option in which the system 100 automatically communicates with the dock manager 240 to request movement of the dock 10. This figure also shows the situation in which the system 100 indicates that the boat 16 has moved away from the dock 10 based on the GPS coordinates of the boat 16, which could indicate either that it has become untethered or stolen. In this situation, the user can use the app on the smart phone 230 to contact the police or the dock manager 240 to take appropriate action. The situation in which lake has receded is shown in FIG. 3B, in which the current position 14c of the shoreline requires that the dock 10 be moved inwardly in the direction of arrow B. Again, the user can use the app on the smart phone 230 to contact the dock manager 240 to take appropriate action.

Also, the system can define a perimeter 310 (also referred to as a "GeoFence") around the dock 16a when it is in a secured position. If the dock becomes partially unsecured, such a due to untethering of one of the securing cables, allowing the dock 16b to move into an unsecured position, then the motion detector 219 (in FIG. 2D) will detect movement of the dock 16b outside of the perimeter 310 and the system 100 will alert the dock manager and the owner of the movement of the dock 16b.

Figure 4:
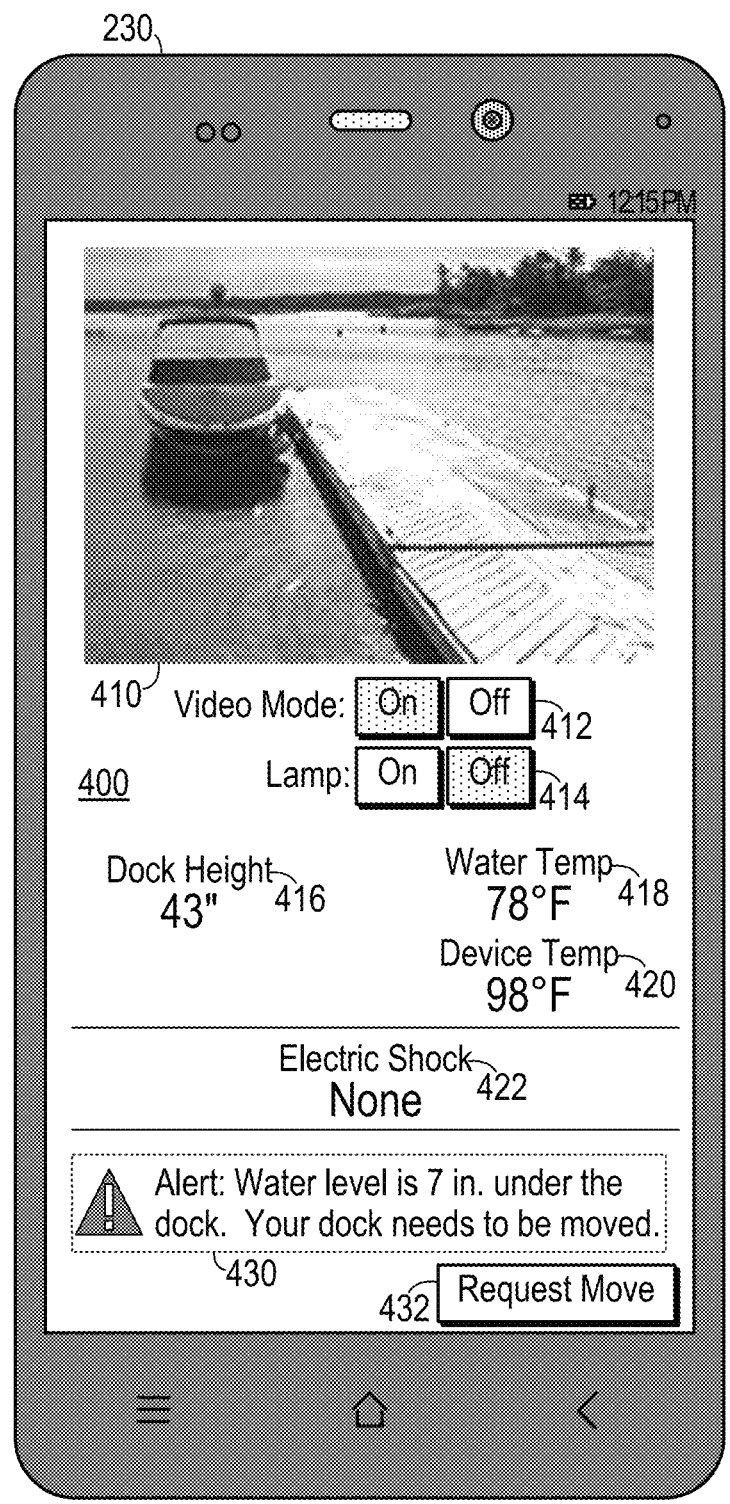
FIG. 4 is a smart phone configured to interact with a dock management system.

As shown in FIG. 4, the user can access the system via a smart phone 230, on which several different screen configurations may be displayed. In the example shown, the user can view video freeze frames of the dock 410 by selecting a video mode 412. One alternate embodiment can transmit full motion real time video from the dock. At night, the user can select a "Lamp On" mode 414, which turns dock lighting on for better viewing. The dock height 416 indicates how high a certain point of the dock is above the water level. The water temperature 418 and the temperature of the controller 420 are also presented to the user. There can be an indication 422 of whether the shock detector has detected a shock hazard. If the water level is such that the dock should be moved either in or out, an alert 430 to that effect may be presented to the user and the user may also be presented with at "Request Move" button 432 which sends a request to the user's dock service company requesting that it move the dock. A similar display can be presented to a dock manager, who may also access a display of the status of all of the docks under its management, including a status list of all requested dock moves.

Figure 5:
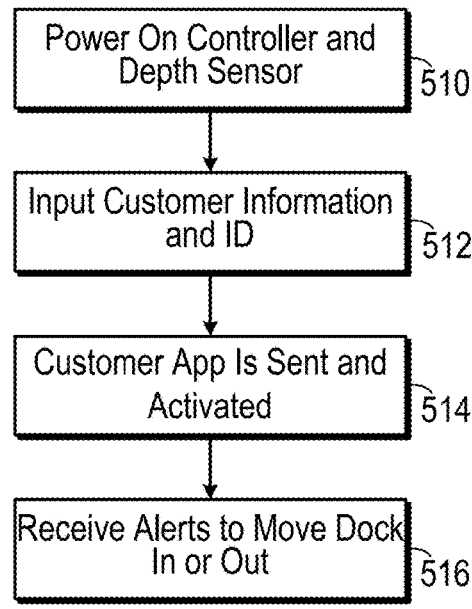
FIG. 5 is a flow chart showing steps taken by a user to employ the system.

As shown in FIG. 5, the user initially powers on the MCU and the depth sensor 510 to run the system and then the user inputs customer information and a ID/password 512. A customer app is then sent to the user 514, which is installed on the user's smart phone and then the user can assess the system 516 to receive alerts, monitor the dock and request dock services.

Figure 6:
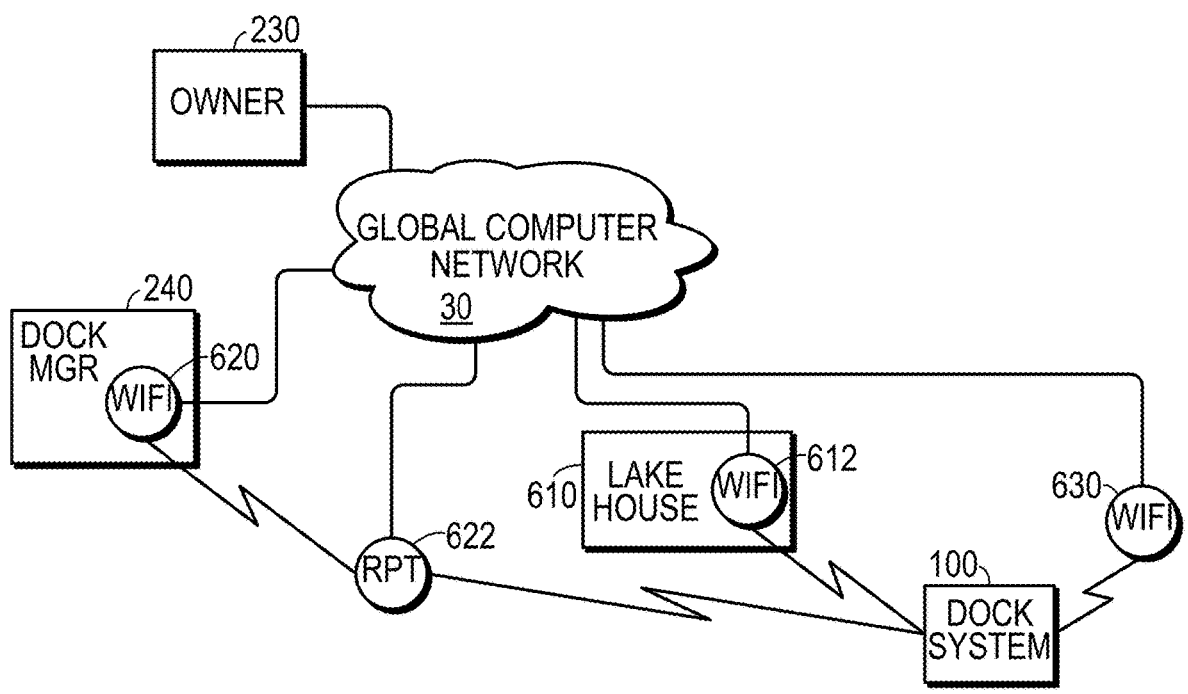
FIG. 6 is a schematic diagram showing different modes of communication.

Communications between the dock and the users can be effected in one of the many ways common to remote communications. For example, as shown in FIG. 6 in one embodiment, the system 100 includes a Wi-Fi chipset that communicates with a Wi-Fi node 630 near the dock. The Wi-Fi node 630 could be in communication with the global computer network 30. Alternatively, the system 100 could communicate with a Wi-Fi node 612 in the owner's lake house 610, if the node 612 has sufficient range. In another embodiment, the system 100 could communicate with a Wi-Fi repeater/booster/extender 622 that communicates with a Wi-Fi node 620 at a central location, such as a dock manager's office 240. Additionally, the system 100 can include a cellular chipset that communicates directly with the concerned parties via a cellular system. Also, the system 100 could be part of a mesh network (such as a ZigBee network) that employs several other similar systems. Also, it could be hardwired or employ private radio communications, depending on the specific circumstances in which it is employed.

The present invention offers users smart mobile monitoring for docks and boats through the use of smart controller and mobile software platform, which can be used by both dock owners and dock dealers/service companies. The mobile dock management technology and service monitors, tracks, and manages docks and boats to provide a safe and secure marine environment. The system can prevent the loss or damage of valuable assets, prevent the loss of lake access, eliminate unnecessary cost, and potentially prevent the loss of life from electric shock. It connects the user, via a cellular network, to multiple devices, such as video cameras, GPS devices, water depth sensors, a water temperature gauge and light switches.

The system adds intelligence to dock and boat management by notifying the owner of problems, irrespective of the owner's location. The mobile app allows the owner to monitor the dock and boats, and to stay in touch with the dock dealer.

The user can set the depth sensor to alert the user when water levels get too shallow or deep. The user can also set a "geo fence" around dock and boats to establish a home position. The user can access a video camera on the dock to see the shoreline and monitor such personal items as boats. Using the app, the user can request services from the dock dealer by touching the screen of the user's smart phone.

In one embodiment, the system monitors docks remotely via a mobile app and dock management system. It receives automatic alerts via notifications and text, communicates with each dock to confirm location, water depth, and movement. It can be used to check video data to monitor the shoreline, the ramp, the dock, the boat and other personal items. When used by a dock manager, it can be used to collect dock movement fees via the mobile app and to provide the mobile app to the customer. The system also allows dock owners to communicate with their dock manager via the mobile app to order services.

The invention offers several advantages, including: it decreases operating costs; it provides automatic notification of docks that need moving; it eliminates unnecessary on-site visits; it decreases gas and wage expenses; it provides GPS dock identification & movement detection; and it ensures that dock fees are paid instantly via the mobile app.

Figure 7:
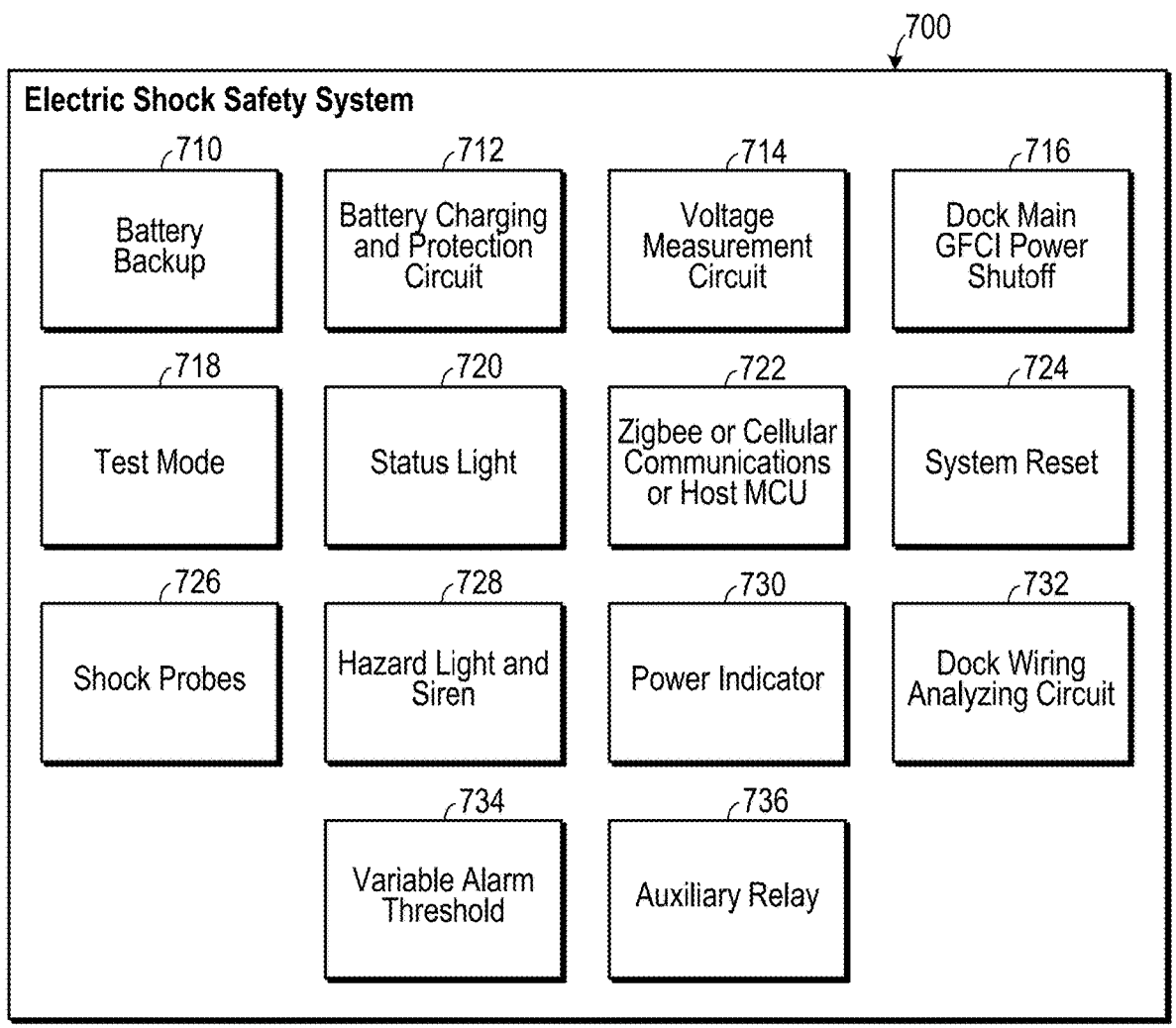
FIG. 7 is a block diagram showing elements included in a shock detection system.

As shown in FIG. 7, one embodiment of the shock safety system includes: a battery backup 710 that provides auxiliary DC power to the Electric Shock Safety System during mains AC power outage; a battery charging and protection circuit 712 that provides: current-limited charging voltage to the Battery Backup System, over-charge battery protection, over-discharge battery protection, and visual charging status and charging complete indicators; a voltage measurement circuit 714 that provides accurate full-range AC measurement from 0VAC to 120 VAC, the output of which is routed to the host MCU, Zigbee, or Cellular Communications device; a dock main GFCI power shutoff 716 that shut-off trips the shore power pole GFCI breaker that feeds power to the dock (this feature is activated either by either the presence of electricity in the water or frame of the dock, depending on the sensitivity mode selected; this feature is also activated depending on the adverse electrical conditions as output from the Dock Wiring Analyzing Circuit.); a test mode button 718 that allows for testing of the hazard light and siren as well as the shore power pole GFCI functionality (forces tripping of the dock electrical safety system), additionally, the test mode selects the shock detection voltage sensitivity level during the configuration mode which is initiated by a system reset by use of the system reset button; a unit status light 720 that displays the system status (the following status may be displayed via a bi-color illumination system: shock sensitivity level configuration mode; shock sensor association/pairing to a parent/coordinator/dock controller or cellular connectivity; six electrical wiring conditions via distinct illumination patterns); a communications chipset 722 that provides the host microprocessor functions in addition to the wireless communication of either Zigbee, Cellular (LTE), Bluetooth (BLE), or Digimesh protocols; a system reset button 724 that provides the ability to reset the Host MCU, Zigbee, and/or Cellular Communications Device; two shock probes 726—one for use in detecting shock hazards in the water and the other for detecting shock hazards on the dock frame, which provide connection of the Voltage Measurement Circuit and the frame of the dock/electrical ground and the water; a hazard light and a siren system 728 that illuminates a daylight-readable illumination device and audible siren under adverse electrical conditions as determined by the Voltage Measurement Circuit or Dock Wiring Analyzing Circuit that visually and audibly conveys the current and desired shock sensitivity level during the configuration mode; a power indicator 730 that provides visual feedback to the presence of AC mains power applied to the Electric Shock Detection System; a dock wiring analyzing circuit 732 that provides electrical circuit wiring detection with the ability to detect a minimum of 6 common electrical wiring conditions, in which each condition allows for a different and distinct Electric Shock Safety (for example; a variable alarm threshold circuit 734 for setting an safe amount of background voltage in the water as a baseline voltage; and an auxiliary relay 736 for shutting off power to auxiliary devices.

In the shock safety system, the processor of the dock wiring analyzing circuit 732 is programmed to: receive voltage values from the electricity probes 726 and when at least two successive second voltage values exceeds the baseline safe voltage by a preset margin, then assert the shock warning signal 728, opening the GFCI power shutoff dock breaker 716 and transmitting a shock warning indication to the remote unit via the communication chipset 722. The control unit cuts off power to the dock and issues alerts when the voltage values exceed the safe baseline value by a preset margin at least two times in one second, but ignores short voltage transients.

The shock detection system can prevent electric shock drowning (ESD) by monitoring the dock frame and water for stray electricity. Stray electricity occurs when electricity escapes its intended circuit and ESD occurs when a person in the water comes in contact with a stray electric current path which causes paralysis, which can result in the victim drowning. When a hazardous voltage is detected, the siren sounds and flashes the red light, power is shut off to the dock instantly, and the unit goes on battery backup and continues to monitor for electricity. Preferably, the sensing distance is at least 80 ft. (depending on water conditions). A push button allows adjustment of threshold settings (e.g., low, medium, high). The system takes multiple readings each second to eliminate false positives from electrical spikes. When a hazardous condition is detected the system transmits a text message to the user and can telephone a dock manager regarding the situation. The system can also present to the remote unit real time voltage data graphs and reports and can track voltage levels on an hourly, daily or weekly basis.

In one embodiment, the following specifications are employed:
Water or Dock Frame Voltage Sensing: 1250 mV
GFCI trip: 36 mA GFCI trip current
Sensing Distance: 80 ft.+*depending on water conditions
Siren and Hazard light: Sound pressure: 90±5 dB(A), Outdoor visible
Battery backup: 24 hours, Chemistry: Lithium-polymer
Indicators: AC power-on & status Light AC Power: 120 VAC 60 Hz Input & 3 W Power Consumption Environmental: −20 to +65 C (−4 F to 149 F), with IP66 rating Zigbee Radio: Communicates with Dock IQ System, Range: 1200 m (4000 ft.)

Dimensions: 10"×7"×3"

Figure 8:
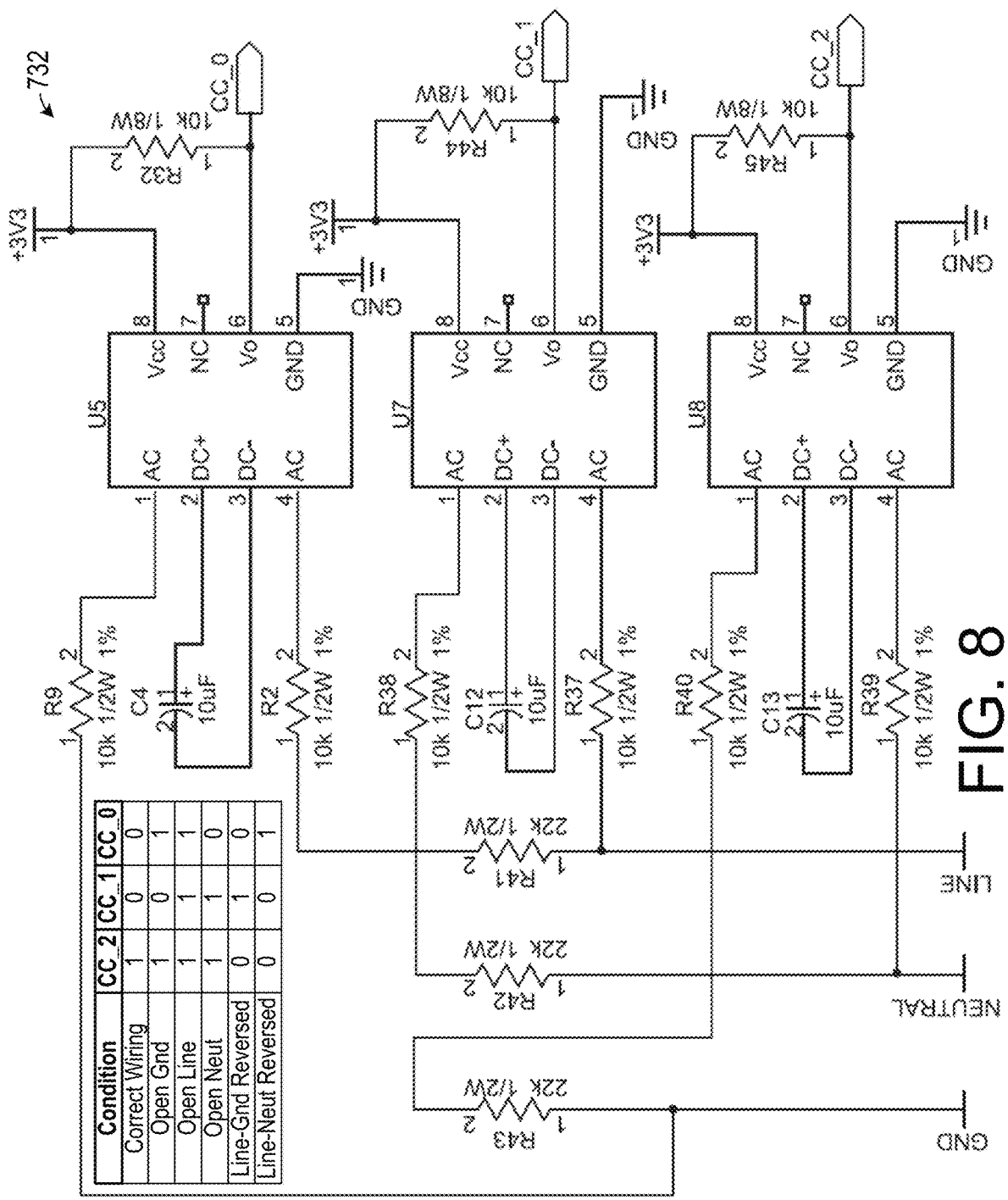
FIG. 8 is schematic diagram showing a dock wiring analyzing circuit.

As shown in FIG. 8, the dock wiring analyzing circuit 732 can indicate each of the following wiring conditions: correct wiring; open ground; open line; open neutral; line reversed with ground; and line reversed with neutral. This circuit includes the following elements: R41, R42, R43: Resistors used for inducing current flow in such a way that correct/incorrect AC wiring can be detected; R2, R9, R37, R38, R39, R40: Resistors used for inducing and limiting current flow into U5, U7, U8. The specific value of these resistors are chosen to set the voltage threshold of the optocouplers; C4, C12, C13: DC smoothing capacitors for rectification circuit; U5, U7, U8: Optocouplers used to isolate digital OC low-voltage circuitry from high-voltage AC circuitry. Optocouplers may be of a kind such that it accepts AC voltage; R32, R44, R45: Current-limiting resistors that provide a 'pull-up' bias for the digital I0 lines CC_0, CC_1, CC_2. The specific combinations of these I0 lines convey the status of the AC wiring at 6 common wiring conditions. The following truth table shows the condition indicated by outputs CC_2, CC_1 and CC_0 (which could be indicated by LEDs):

| Condition | CC_2 | CC_1 | CC_0 |
| --- | --- | --- | --- |
| Correct Wiring | 1 | 0 | 0 |
| Open Gnd | 1 | 0 | 1 |
| Open Line | 1 | 1 | 1 |
| Open Neut | 1 | 1 | 0 |
| Line-Gnd Reversed | 0 | 1 | 0 |
| Line-Neut Reversed | 0 | 0 | 1 |

Figure 9:
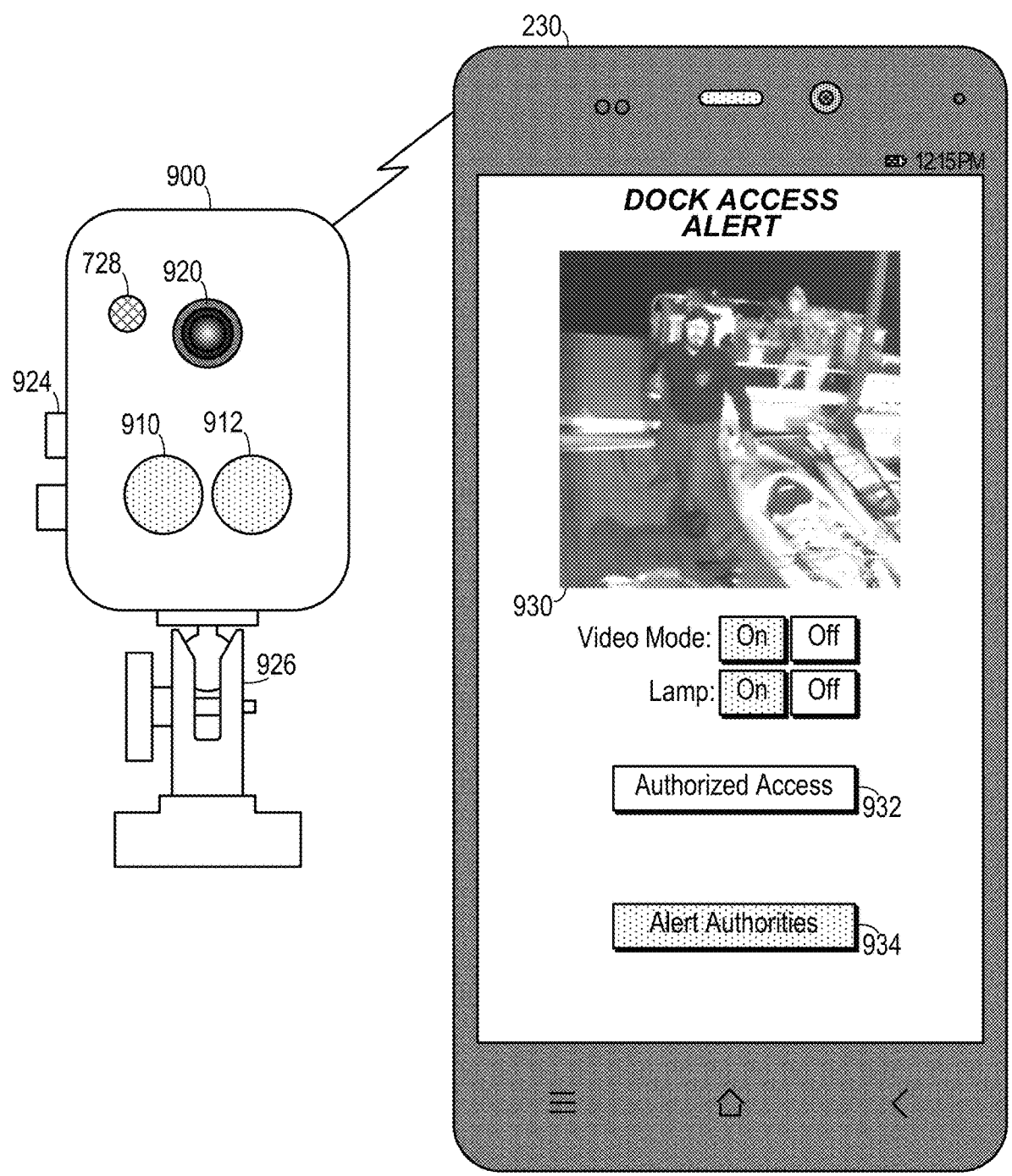
FIG. 9 is a schematic diagram showing a dock video security system and a remote unit interacting therewith.

As shown in FIG. 9, one embodiment of the security unit 900 can include a first IR motion detector 910, a second IR motion detector 912 and a digital (e.g. CMOS) camera 920 that is aimed at a preselected portion of the dock. Aiming can be facilitated with a gimballed magnetic mount 926. Calibration can be effected by way of user inputs 924. When both IR motion detectors 910 and 912 detect motion (two are used to avoid spurious activations), the camera 920 will take a picture and apply it to an artificial intelligence system (e.g., a convolutional neural network) that determines if a human is appearing in the picture. If a human appears, a copy of the picture 930 is sent to the remote unit 230 for user evaluation. The user can be provided with a button 934 that sends an alert to the authorities if the picture indicates suspicious activity. On the other hand, the user can press a button 932 that indicates that the access is authorized. The IR motion sensors couple infrared motion technology with AI to detect changes in motion/energy on the dock. Once a change is detected, the camera turns on and takes pictures. These pictures are then scanned by AI, to detect if the changes are caused by a human. If AI does not see a human, the system resets, eliminating false alarms. The high-resolution camera 920 and sensors 910 and 912 are adapted for a marine environment. The system can employ a magnetic mount that allows the user to mount it quickly. The system also supports installing multiple cameras on a dock and allows the user to assign a name to each.

The following technical specifications may be employed in one embodiment:

5-megapixel SoC image sensor

¼ in lens size 110 vac @ x.x amps

Power cord length: 20 feet

−30 to 70 C temp range

HD 720 or 1080p resolution

AC powered 4 different photo size settings: Tiny 320×240, Small 640×380, Medium 1024×768, Large 1280×960

Fixed lens

Camera view priority zone=approximately 40 feet

Figure 10:
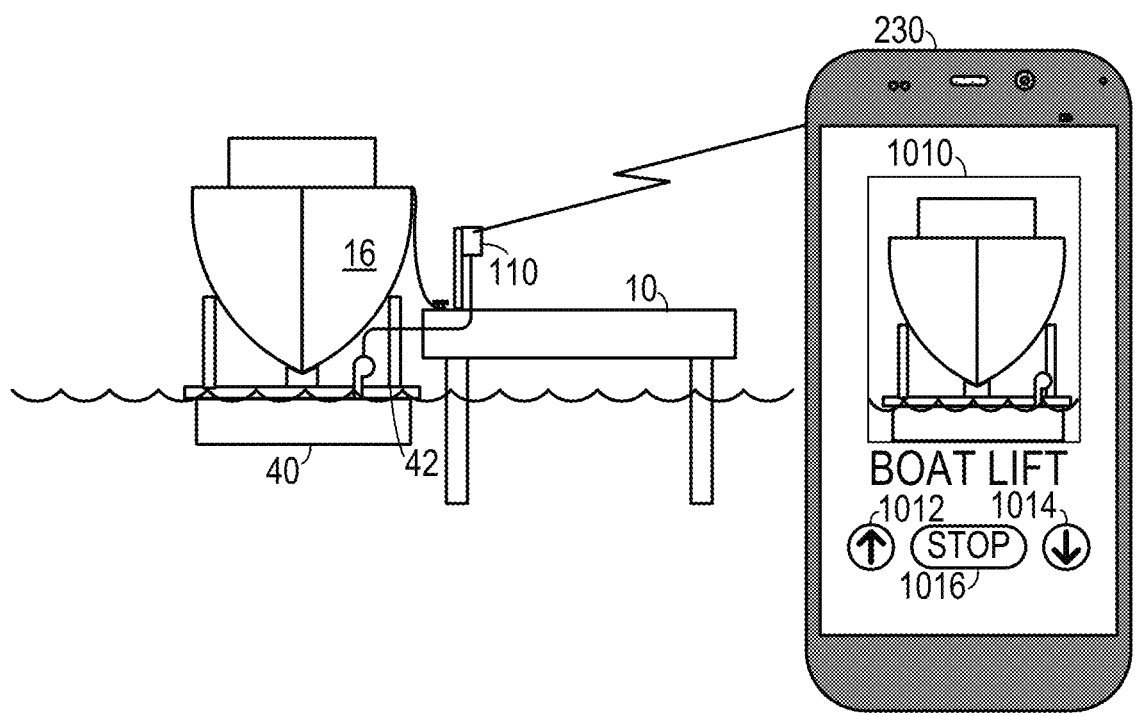
FIG. 10 is a schematic diagram of a boat lift control system and a remote unit interacting therewith.

As shown in FIG. 10, the system can also control a boat 16 lift system 40 actuator 42 (such as a blower when the lift system uses an air displacement tank to lift the boat 16). The system can be accessed by the remote unit 230 that presents the user with a raise boat button 1012, a lower boat button 1014 and a disable movement button 1016 to control the actuator 42 remotely. Certain embodiments may also provide live video 1010 of the boat so that the user can determine its position.

Figure 11:
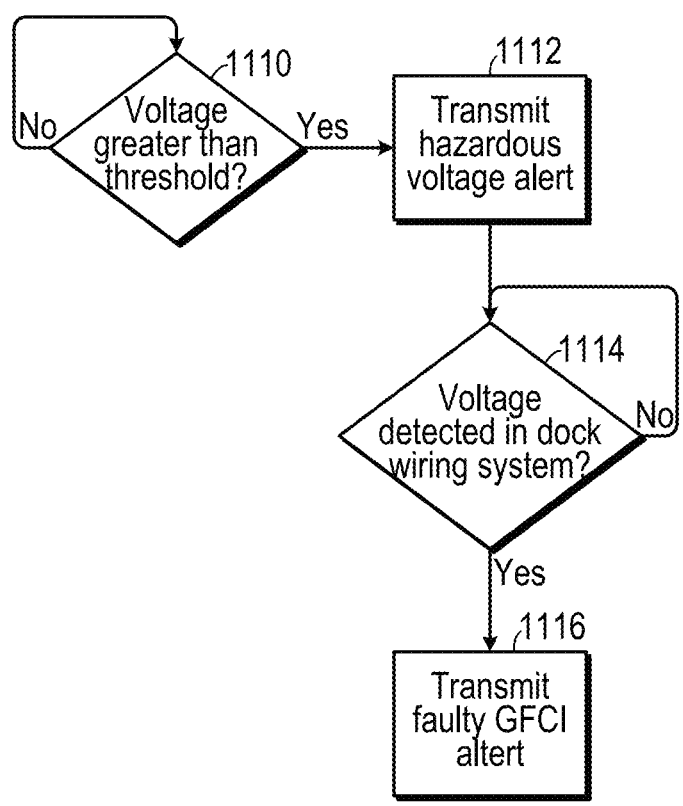
FIG. 11 is a flow chart showing one embodiment of programming for the controller.

As shown in FIG. 11, in one embodiment, the controller is programmed to first determine if the voltage sensed in the water is greater the baseline safe voltage threshold 1110 and if it does, then it transmits a hazardous voltage alert 1112 via the communications chipset. Next, it determines if the hazardous voltage is still present 1114 in the dock wiring system, which would indicate that the GFCI (i.e., the dock breaker) did not open correctly. In such a situation, the controller then transmits a faulty GFCI alert 1116. Such an alert is important because a dock user might think that the tripping of the GFCI would remove any voltage hazards.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An electric shock detection system for use with a dock having a dock frame and a dock wiring system that is connected to a power source by a dock breaker, the dock being disposed in water, the electric shock detection system configured for use with a remote unit, comprising:
   (a) at least one electricity probe configured to detect an electric voltage between a ground and at least one of the dock frame or the water;
   (b) a shock hazard indicator disposed adjacent to the dock that generates a human-perceptible indication of a shock hazard when a shock warning signal is asserted;
   (c) a communication chipset in communication with the remote unit; and
   (d) a control unit disposed on the dock and responsive to the at least one electricity probe and in communication with the shock hazard indicator and the communication chipset, wherein the control unit includes a processor that is programmed to:
      (i) store a first voltage value received from the at least one electricity probe, the first voltage value being no greater than a voltage known to be safe and designated as a baseline safe voltage;
      (ii) receive a plurality of second voltage values from the at least one electricity probe;
      (iii) when at least two successive second voltage values of the plurality second voltage values exceeds the baseline safe voltage by a preset margin, then assert the shock warning signal, open the dock breaker and transmit a shock warning indication to the remote unit via the communication chipset;
      (iv) when at a voltage is sensed in the dock wiring system after the dock breaker has been opened, then transmit a faulty dock breaker warning indication to the remote unit via the communication chipset.

2. The electric shock detection system of claim 1, wherein the control unit takes at least two second voltage values per second and wherein the processor is programmed to determine that the plurality second voltage values exceeds the first voltage value by a preset margin when more than one second voltage value exceeds the threshold per second and wherein the processor is programmed to ignore a second voltage value that exceeds the first voltage value by a preset margin when not more than one second voltage value exceeds the threshold per second.

3. The electric shock detection system of claim 1, further comprising a circuit that indicates each of the following wiring conditions: correct wiring; open ground; open line; open neutral; line reversed with ground; and line reversed with neutral.

4. The electric shock detection system of claim 1, further comprising a battery backup that powers the electric shock detection system when power from the power source is not available.

5. The electric shock detection system of claim 1, wherein the shock warning signal includes an audible alarm.

6. The electric shock detection system of claim 1, wherein the communication chipset comprises a cellular telephone chipset and wherein the shock warning indication comprises a graphical indication appearing on a cellular telephone.

7. A method of warning of a hazardous electrical condition at a dock with wiring coupled to a voltage source via a dock breaker, comprising the steps of:
   (a) detecting an electric voltage between a ground and at least one of the dock frame or the water;
   (b) storing a plurality of voltage values of the electric voltage;
   (c) when at least two successive voltage values of the plurality voltage values exceeds a baseline safe voltage by a preset margin, then asserting a shock warning signal, opening the dock breaker and transmitting a shock warning indication to a remote unit via a communication chipset;
   (d) when at a voltage is sensed in the dock wiring system after the step of opening the dock breaker, then transmitting a faulty dock breaker warning indication to the remote unit via the communication chipset.

* * * * *